United States Patent

Nunn

[15] 3,691,770
[45] Sept. 19, 1972

[54] THRUST CONTROL MEANS FOR A SOLID PROPELLANT ROCKET MOTOR

[72] Inventor: Robert H. Nunn, Davis, Calif.

[73] Assignee: The United States of America as represented by the Secretary of the Navy

[22] Filed: Dec. 2, 1966

[21] Appl. No.: 599,347

Related U.S. Application Data

[63] Continuation-in-part of Ser. No. 385,104, July 23, 1964, abandoned.

[52] U.S. Cl. ................................. 60/254, 60/271
[51] Int. Cl. ........................................ F02k 9/04
[58] Field of Search............60/254, 253; 239/265.17, 265.23, 239/265.31

[56] References Cited

UNITED STATES PATENTS 3,000,178  9/1961  Logerot................239/265.17
3,073,112  1/1963  Bleikamp, Jr................60/242

FOREIGN PATENTS OR APPLICATIONS 782,852  9/1957  Great Britain........239/265.17

Primary Examiner—Samuel Feinberg
Attorney—G. J. Rubens, R. Miller, V. C. Muller and M. F. Oglo

EXEMPLARY CLAIMS

1. In a variable thrust rocket motor of the type having a combustion chamber and a solid propellant grain with burning characteristics which produce an increase in burning rate of the grain with increase in combustion chamber pressure and a corresponding increase in thrust, and an igniter for initiating combustion of the grain, the improvements, in combination, comprising;
   A. An exhaust nozzle having;
      a. a convergent sub-sonic portion communicating with said combustion chamber through which a main stream of combustion chamber gases flow,
      b. an axially aligned supersonic divergent exhaust portion, and
      c. an effective throat portion disposed axially between the convergent and divergent portions, the outer wall of which is formed by an envelope of inwardly moving combustion chamber by-pass gases at substantially combustion chamber pressure adapted to mix with the main stream, the cross-sectional area of said envelope being variable, dependent upon the quantity of by-pass gases delivered thereto, and
   B. means for controlling the quantity of by-pass gases delivered to said envelope and main stream,
   C. the construction and arrangement being such that when the quantity of by-pass gases is increased relative to the quantity in the main stream, the envelope is constricted, reducing the effective throat area and increasing chamber pressure and thrust, and when the quantity of by-pass gases is decreased relative to the quantity in the main stream, the envelope is enlarged, increasing the effective throat area and decreasing chamber pressure and thrust.

5 Claims, 3 Drawing Figures

PATENTED SEP 19 1972  3,691,770

INVENTOR.
ROBERT H. NUNN
BY
P. H. Fisht
ATTORNEY.

THRUST CONTROL MEANS FOR A SOLID PROPELLANT ROCKET MOTOR

The present invention, a continuation-in-part of application Ser. No. 385,104, filed July 23, 1964, now abandoned, relates generally to control devices and more particularly to means for varying the thrust levels obtainable from solid propellant rocket motors.

The invention described herein may be manufactured and used by or for the Government of the United States of America for governmental purposes without the payment of any royalties thereon or therefor.

Broadly stated, a simple rocket motor comprises a sealed propellant combustion chamber having a convergent-divergent discharge nozzle through which hot gases of combustion, or rocket exhaust, is permitted to escape the chamber at high pressures and velocities, as a propellant is burned therewithin, for establishing a motor propelling thrust or rate of propellant energy release.

Conceivable applications of solid propellant rocket motors are many and encompass a very broad area. However, the use of these motors has been somewhat limited due to an existing lack of feasible means for imparting variable-thrust characteristics thereto.

While the amount of chemical energy available in a rocket motor is fixed by the chemical formulation of the propellant, it is known that in such a motor a relationship exists between the effective throat area, the developed chamber pressure, the burning rate for a given propellant, and the resulting thrust. For example, if the effective throat area of the nozzle is increased, the combustion chamber pressures will be decreased, whereupon, the burning rate will decrease with an attendant drop in the thrust level. Further, if the effective cross-sectional area of the throat is decreased, the pressure in the combustion chamber will be increased, whereupon, an increase in the propellant burning rate, with an attendant increase in the thrust level, will be experienced. Hence, various means and methods have been proposed for selectively controlling the throat area of a nozzle to impart variable-thrust characteristics to solid propellant rocket motors.

Past efforts to provide means for selectively varying the thrust of solid propellant rocket motors have involved relatively elaborate schemes, typified by propellant density control burning surface programming, and the use of displaceable mechanical nozzle elements, such as disclosed in U. S. Pat. No. 3,073,112. Heretofore, these efforts have resulted in devices which have not satisfactorily fulfilled existing needs, as existing devices involve high weight and cost, and have not been found to be fully reliable, due, in part, to complexity factors. Further, where density control burning surface programming mechanisms are relied on to provide thrust control, a lack of control flexibility exists, since these mechanisms normally lack the capability of responding to command signals received during periods of propellant burning.

Therefore, the general purpose of the present invention is to overcome the aforementioned disadvantages and provide a simple, lightweight, economic, and highly reliable device capable of accurately controlling the thrust of rocket motors for imparting variable-thrust characteristics to conventional solid propellant rocket motors.

An object of the instant invention is to provide a simple, reliable, and economic means for selectively controlling the effective throat areas for convergent-divergent exhaust nozzles, as provided for solid propellant rocket motors.

Another object is to provide a simple device, which utilizes by-passed exhaust gases for selectively varying the effective cross-sectional throat areas in rocket motor exhaust nozzles.

A further object is to provide a highly reliable control device, including a reciprocating nozzle insert, for selectively varying thrust levels for solid propellant rocket motors through a selective injection of motor exhaust gases into the throat of a motor exhaust nozzle in a manner which serves to selectively vary the nozzle's effective throat area.

Yet another object is to provide a simple, economical, and highly reliable means for by-passing gases generated by the burning of solid propellants and selectively injecting the gases in transverse directions into the throat of an elongated exhaust nozzle for imparting variable-thrust characteristics to rocket motors of conventional design.

Other objects, advantages and novel features of the invention will become apparent from the following detailed description of the invention when considered in conjunction with the accompaying drawings wherein:

FIG. 1 comprises a partial cross-sectional view of a solid propellant rocket motor illustrating an intermediate position for a reciprocating nozzle insert, or divergent nozzle section, as provided for in the instant invention;

Figure 1:
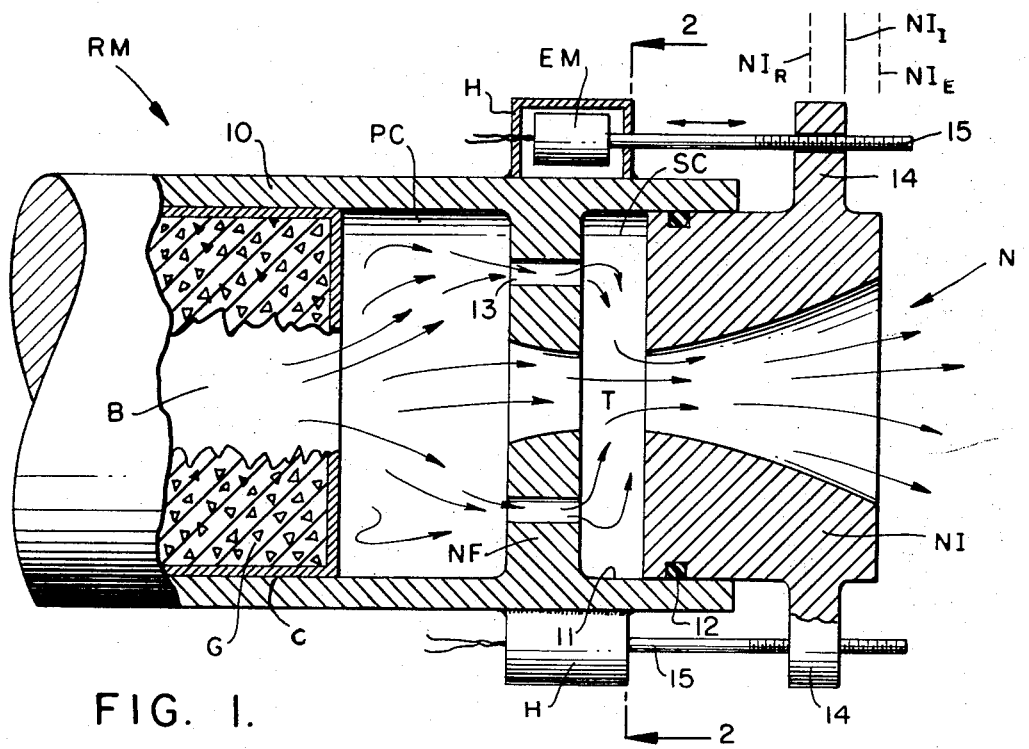

Referring now to the drawings, wherein like reference characters designate like or corresponding parts throughout the several views, there is shown in FIG. 1 a rocket motor, generally designated RM, of the type utilizing a solid propellant and commonly referred to as a solid-propellant rocket motor. The propellant comprises an elongated grain G of solid propellant which is formed by any suitable process and formed of any suitable chemical composition, together with a suitable conventional igniter (not shown) for initiating combustion of the grain. The grain G is inserted into a combustion chamber C, formed within the rocket motor's case 10, and is secured in place within the chamber through any suitable and conventional means. Combustion of the grain G occurs along the surface of a bore B, extending along the longitudinal axis of the grain G, so that the propellant may burn outwardly through the grain and provide gases of combustion, or exhaust gases.

To simplify the operation to be subsequently described, by eliminating one variable, it will be assumed that grain G has neutral burning characteristics, that is, it has constant burning area during its consumption as distinguished from progressive or regressive burning characteristics in which the burning area increases or decreases, respectively. Bore B may thus be in the form of an internal star, or the grain may be formed as a hollow rod, or rod and tube, forms which have substantially neutral burning characteristics. These forms are conventional as disclosed by "Rocket Propulsion Elements" by George P. Sutton, third edition (1963) published by John Wiley and Sons, New York, particularly Chapter 12, page 360. As in the patent above identified, the thrust control of this invention operates best with solid propellant grains having large burning rate exponents, n. Formulations for such grains are also conventional and well known, examples of which are disclosed in Chapter 10 of the text book above referred to. Referring also to page 323 of the text book, the chamber pressure, $$Pc \sim \left(\frac{Ab}{At}\right) \frac{1}{(1-n)}$$

where $Ab$ is the grain burning area, $At$ is the nozzle throat area, and n is the burning rate exponent. If $Ab$ remains constant, as above assumed for simplifying the operation, then $$Pc = K \left(\frac{1}{At}\right) \frac{1}{(1-n)}$$

(compare with equation (10-6), page 323 of the text). Since $n$ may approach 1 but normally not exceed 1 and is a constant for a particular grain formulation, the above equation becomes: $Pc = K (1/At)^P$, where $P$ is a power greater than 1. As will now be apparent, $Pc$ will now increase with a decrease in $At$ and increase as n approaches 1. This invention contemplates use of propellants which have a value of $n$ between about 0.7 as a low limit and about 0.95 as a high limit, the former being considered moderate sensitivity and the latter high sensitivity of burning rate with change of combustion chamber pressure. While a neutral burning grain has been assumed, it is to be understood that this was for the purpose of simplifying the analysis above, and that the grain burning area may be progressive or regressive, depending upon the thrust desired during its consumption. As shown, the grain G is retained in a position within the chamber C in a manner such as to establish a void or primary chamber PC near the aft end of the combustion chamber C, wherein a pressure build-up in the exhaust gases may occur as the propellant is caused to burn. In order that the gases of combustion, or exhaust, may escape the motor RM to ambient atmosphere, a convergent-divergent nozzle N having a gas flow restricting throat T communicating with the combustion chamber C is provided at the aft end of the motor RM.

The nozzle N includes a fixed convergent nozzle section NF and a displaceable divergent nozzle section or nozzle insert NI. The fixed convergent section NF may be integrally formed as an element of the motor case 10 and serves to confine gases of combustion at the aft end of the primary chamber PC, while the divergent nozzle section or nozzle insert NI serves as the exit end of the nozzle N and communicates with ambient atmosphere. The nozzle insert NI is inserted into an elongated recessed portion 11 machined or otherwise formed in the aft end of the rocket motor case 10. The portion 11 receives the nozzle insert NI and provides a bearing surface along which the nozzle insert NI may be operatively reciprocated in a fluid pressure sealing engagement therewith. An O-ring seal 12, formed of any suitable material, may be provided and seated about the leading portion of the nozzle insert NI to insure that a pressure seal is established between the outer surfaces of the nozzle insert and the surface of the recessed portion 11 of the case 10. Consequently, a secondary pressure chamber SC may be established within the recess 11, between the two nozzle sections NF and NI, as the insert NI is reciprocated. The longitudinal dimension of the secondary chamber SC will necessarily be varied as the nozzle insert NI is operatively displaced.

The secondary chamber SC communicates with the primary chamber PC through a plurality of gas conduits or passageways 13, through which gases of combustion or by-pass gas is directed from the primary chamber PC into the secondary chamber SC. The conduits 13 may be varied in number and size as found necessary, however, it is desirable that the exhaust gases be passed from the chamber PC through the conduits 13 into the secondary chamber SC with a minimal loss of the energy imparted to the matter of the gases.

Figure 3:
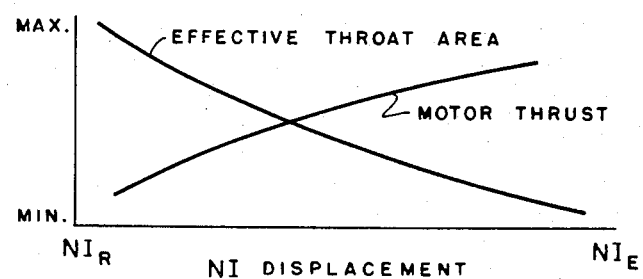
FIG. 3 is a graphic view illustrating the effects of imparted nozzle insert displacement.
Figure 2:
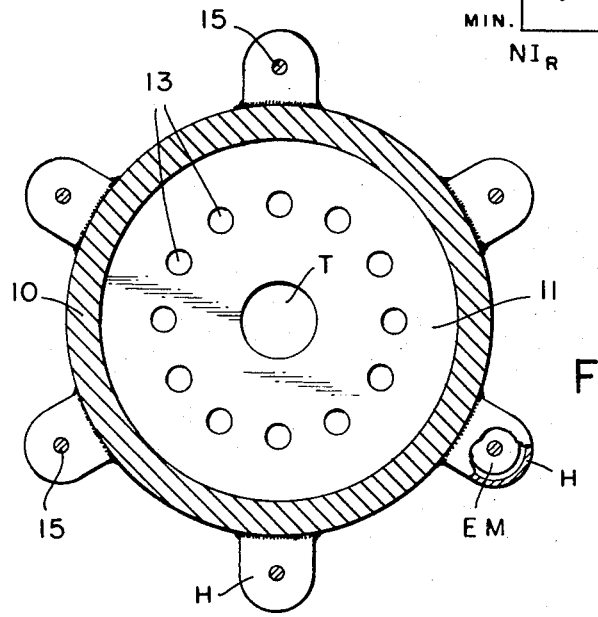
FIG. 2 is a cross-sectional view taken generally along lines 2—2 of FIG. 1.

The chamber SC functions to provide a variable means for injecting the by-pass gases transversely into the main stream of the exhaust gases passing from the chamber PC axially through the throat T. As the by-pass gases are injected, a constriction is imposed on the main stream of exhaust gases, due to the fact that the by-pass gases are directed inwardly about the circumference of the stream and provide a fluid layer between the main stream and the surface of the throat T. When the nozzle insert or divergent nozzle section NI is in its retracted position, designated $NI_R$, FIG. 1, the longitudinal dimension of the chamber SC is reduced to substantially zero so that a minimum quantity of by-pass gas is injected into the stream of exhaust gases. In the absence of a gas-established layer, the effective area of the throat T will be at a maximum value, with the thrust level being reduced to a minimum value, as illustrated in FIG. 3. As the nozzle insert or divergent nozzle section NI is displaced through intermediate positions, designated $NI_I$, FIG. 1, in a direction extending away from the convergent nozzle section NF, the longitudinal dimension of the chamber SC is increased. Consequently, the quantity of by-pass gas injected into the stream of exhaust gases is increased. The resulting effect is that an increased constriction of the main stream, or a reduction in the effective cross-sectional area of the throat T, is experienced. As the nozzle insert NI approaches its fully extended position, designated $NI_E$, FIG. 1, the reduction in effective throat area approaches a maximum value and the thrust level is raised to a maximum value, FIG. 3. The specific effect that a reduction in the effective area of the throat T will have on the thrust level will necessarily depend upon the sensitivity of the specific propellant utilized in the formulation of the grain G. In some instances it may be desirable to terminate thrust prior to the complete consumption of the grain. To attain this end, the effective nozzle throat area, when the nozzle insert is at its retracted position, $NI_R$, is so proportioned to the grain burning area that it will not maintain sufficient combustion chamber pressure to support combustion of the grain. Thus, by movement of the nozzle insert to this position, the burning may be extinguished to terminate thrust.

It is to be particularly noted that in utilizing by-passed gases of combustion, it is possible to provide a self-contained, constant source of gases at pressures and velocities proportional to those of the main stream of exhaust gases. Hence, as the velocity and pressure of the exhaust gases is increased, the velocity and pressure of the by-passed gas will be increased, whereby a supply of gases at pressures and velocities sufficient for injection purposes will constantly be made available.

In order to reciprocate the divergent nozzle section or insert NI, various selectively operable mechanical linkages may be employed. As shown, a plurality of reversible dc (direct current) motors EM, of a suitable design, as dictated by the use and environment of the motor RM, may be utilized. The motors EM are supported in a suitable fairing H formed about the external surfaces of the motor case 10. The motors EM are operatively connected with the nozzle insert NI through threaded brackets 14, fixed to the nozzle insert NI, and conventional jack-screws 15. Each of the motors EM is electrically connected with a suitable common control, not shown, whereby the motors EM may respond to command signals and be simultaneously activated and operated for rotatably driving all of the jack-screws 15 in a common direction, and in unison. Thus the jack-screws 15 serve to extend and retract the nozzle insert NI as the motors EM respond to command signals directed from the command control. The command signals may 9 be initiated from a ground monitor-transmitter system, or, if desired, from a condition responsive system disposed within a rocket motor transported package, also not shown.

In operation, the thrust of the rocket motor RM may be varied by simultaneously activating the motors EM, in response to command signals initiated from a selected source, for rotatably driving the jack-screws 15 in unison. The activated motors EM drive the associated jack-screws 15 relative to the brackets 14 to thus displace the nozzle insert NI along the surfaces of the recess 11. As the position of the nozzle insert NI is varied through intermediate positions $NI_I$, between its fully retracted position $NI_R$ and its fully extended position $NI_E$, the thrust of the rocket motor RM is varied in accordance therewith, as illustrated in FIG. 3, due to a varying of the quantity of by-pass gas injected into the main stream of exhaust gases. When the nozzle insert NI is extended toward its extended position $NI_E$, an increased quantity of by-pass gas is injected normally into the main stream of exhaust gases passing through the throat T, which serves to effectively constrict the throat T, or reduce its effective area, and thereby causes a build-up in combustion chamber pressures to occur. This pressure build-up serves to increase the burning rate of the propellant of the grain G. The increased burning rate, in turn, serves to increase the rate of energy release or the level of the thrust obtained from the rocket motor RM. If the nozzle insert NI is retracted, a reduced quantity of by-pass gas will be injected into the main stream as it passes through the throat T and an increase in the effective surface area of the throat T will be experienced. This increase in the effective throat area serves to initiate a reduction in the pressures of the combustion chamber C and, consequently, a reduction in the burning rate of the propellant of the grain G. As the burning rate of the propellant is caused to decrease, a reduction in the thrust level for the rocket motor will be experienced.

Therefore, it is to be understood that the present invention provides a simple, reliable, and efficient device capable of initiating changes in the levels of the thrust provided by a rocket motor.

Obviously many modifications and variations of the present invention are possible in the light of the above teachings. It is therefore to be understood that within the scope of the appended claims the invention may be practiced otherwise than as specifically described.

What is claimed is:

1. In a variable thrust rocket motor of the type having a combustion chamber and a solid propellant grain with burning characteristics which produce an increase in burning rate of the grain with increase in combustion chamber pressure and a corresponding increase in thrust, and an igniter for initiating combustion of the grain, the improvements, in combination, comprising;

A. An exhaust nozzle having;
      a. a convergent sub-sonic portion communicating with said combustion chamber through which a main stream of combustion chamber gases flow,
      b. an axially aligned supersonic divergent exhaust portion, and
      c. an effective throat portion disposed axially between the convergent and divergent portions, the outer wall of which is formed by an envelope of inwardly moving combustion chamber by-pass gases at substantially combustion chamber pressure adapted to mix with the main stream, the cross-sectional area of said envelope being variable, dependent upon the quantity of by-pass gases delivered thereto, and
   B. means for controlling the quantity of by-pass gases delivered to said envelope and main stream,
   C. the construction and arrangement being such that when the quantity of by-pass gases is increased relative to the quantity in the main stream, the envelope is constricted, reducing the effective throat area and increasing chamber pressure and thrust, and when the quantity of by-pass gases is decreased relative to the quantity in the main stream, the envelope is enlarged, increasing the effective throat area and decreasing chamber pressure and thrust.

2. Apparatus in accordance with claim 1 wherein said means for controlling the quantity of by-pass gases comprises an annular space of variable axial length surrounding said throat portion, forming a valve for controlling flow of the by-pass gases, said space communicating with the combustion chamber, and means for varying the axial lengths of said space and throat portion.

3. Apparatus in accordance with claim 2 wherein said convergent portion is disposed in a fixed end wall of the combustion chamber, and said divergent portion is axially moveable relative thereto.

4. Apparatus in accordance with claim 3 wherein said divergent portion is formed with a circular periphery, and a bore in the motor for receiving same for axial movement therein.

5. Apparatus in accordance with claim 1 wherein the burning rate exponent of the grain is approximately between 0.7 and 0.95.

* * * * *